United States Patent
Harris et al.

(10) Patent No.: US 12,071,550 B2
(45) Date of Patent: Aug. 27, 2024

(54) METHOD AND PROCESS FOR AEROSOL JET PRINTING REGENERATED SILK FIBROIN SOLUTIONS

(71) Applicant: Georgia Tech Research Corporation, Atlanta, GA (US)

(72) Inventors: Tequila A. L. Harris, Atlanta, GA (US); Kyriaki Kalaitzidou, Atlanta, GA (US); Yuhan Xiao, Atlanta, GA (US); Donggang Yao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 455 days.

(21) Appl. No.: 17/177,631

(22) Filed: Feb. 17, 2021

(65) Prior Publication Data

US 2021/0253881 A1 Aug. 19, 2021

Related U.S. Application Data

(60) Provisional application No. 62/977,449, filed on Feb. 17, 2020.

(51) Int. Cl.

| | |
|---|---|
| *B41J 2/215* | (2006.01) |
| *B05D 1/12* | (2006.01) |
| *C09D 11/08* | (2006.01) |
| *C09D 11/30* | (2014.01) |
| *B05B 7/00* | (2006.01) |
| *B05D 1/02* | (2006.01) |

(52) U.S. Cl.
CPC ............... *C09D 11/08* (2013.01); *B05D 1/12* (2013.01); *B41J 2/215* (2013.01); *C09D 11/30* (2013.01); *B05B 7/00* (2013.01); *B05D 1/02* (2013.01)

(58) Field of Classification Search
CPC .......... C09D 11/08; C09D 11/30; B05D 1/02; B05D 1/12; B41J 2/215; B05B 7/00
USPC ....................................................... 427/421.1
See application file for complete search history.

(56) References Cited

U.S. PATENT DOCUMENTS

| | | | |
|---|---|---|---|
| 10,464,361 B2 * | 11/2019 | Omenetto | ............ B41M 5/0047 |
| 10,731,046 B2 * | 8/2020 | Omenetto | .......... A61K 41/0052 |
| 11,512,425 B2 * | 11/2022 | Altman | ..................... C08H 1/00 |

(Continued)

FOREIGN PATENT DOCUMENTS

| | | | |
|---|---|---|---|
| JP | 2015140328 A | * 8/2015 | |
| WO | WO-2013159101 A1 | * 10/2013 | ............. A23L 1/305 |
| WO | WO-2019067745 A1 | * 4/2019 | ........ C07K 14/43586 |

*Primary Examiner* — Brian K Talbot
(74) *Attorney, Agent, or Firm* — Bryan W. Bockhop; Bockhop Intellectual Property Law, LLLC

(57) ABSTRACT

In a method of depositing a fibroin structure, a fibroin ink is generated. The fibroin ink is aerosol jet printed onto a substrate. To prepare the ink, a plurality of biologically-generated silk cocoons are each cut into at least two pieces of raw silk and are degummed to remove sericin, leaving fibroin fibers. The fibroin fibers are dissolved into a lithium bromide solution. The salt is removed by placing the fibroin/salt solution in a dialysis membrane tube and submerging it in deionized water. The fibroin solution is centrifuged to remove impurities therefrom, leaving fibroin ink. The fibroin ink is atomized into a fibroin ink aerosol, which is directed to a print nozzle. A focusing gas sheath is directed around the print nozzle to deposit fibroin onto a surface.

**19 Claims, 2

(56) References Cited

U.S. PATENT DOCUMENTS

| | | | |
|---|---|---|---|
| 2015/0368417 A1* | 12/2015 | Omenetto | G03F 7/0002 |
| | | | 101/463.1 |
| 2017/0130192 A1* | 5/2017 | Retting | C12N 5/0697 |
| 2017/0218228 A1* | 8/2017 | Jose | B33Y 30/00 |
| 2020/0308424 A1* | 10/2020 | Sakai | C09D 129/04 |
| 2022/0003676 A1* | 1/2022 | Mazed | G06Q 30/0631 |
| 2022/0177530 A1* | 6/2022 | Altman | C08J 7/0427 |
| 2022/0204964 A1* | 6/2022 | Kaplan | C08J 3/24 |
| 2022/0205165 A1* | 6/2022 | Fei | D06M 15/15 |
| 2023/0105414 A1* | 4/2023 | Kotwal | D06P 3/04 |
| | | | 428/473 |

* cited by examiner

METHOD AND PROCESS FOR AEROSOL JET PRINTING REGENERATED SILK FIBROIN SOLUTIONS

CROSS-REFERENCE TO RELATED APPLICATION(S)

This application claims the benefit of U.S. Provisional Patent Application Ser. No. 62/977,449, filed Feb. 17, 2020, the entirety of which is hereby incorporated herein by reference.

STATEMENT OF GOVERNMENT SUPPORT

This invention was made with government support under grant number 1562255, awarded by the National Science Foundation. The government has certain rights in the invention.

BACKGROUND OF THE INVENTION

1. Field of the Invention

The present invention relates to printing methods and, more specifically, to a method of printing silk fibroin.

2. Description of the Related Art

Silk fibroin produced by silkworms has been used commercially as biomedical sutures and the like due to its unique combination of mechanical properties, biocompatibility, and biodegradability. As shown in FIG. 1, silk fibroin 14 is the fibrous material found in the center part of a cocoon 10 of a silkworm, which is surrounded by a sericin shell 12.

There have been attempts to use regenerated silk fibroin (RSF) solutions to fabricate form such as films, coatings, sponges and nanofibers, to exploit its properties for various applications, including drug delivery, packaging, biosensors, and wound treatment. These biomaterials have been found to be a preferred alternative to synthetic polymer structures. For example, due to its low inflammatory response and similar permeability and diffusivity, silk fibroin has potential for encapsulating controlled release pharmaceuticals. Fibroin has been used to encapsulate certain drugs, small molecules, and other biomolecules due to its higher biocompatibility and biodegradability. Silk fibroin has been shown to accelerated wound healing compared with commercially available products in clinical trials. In the food packaging industry, odorless silk fibroin coatings are used to prolong the freshness and firmness of fruit, due to its porosity and biodegradability.

From the perspective of microscale applications, layer-by-layer fabricated capsules, drug delivery of microparticles or nanoparticles, scaffolds for tissue microenvironment and biosensors (such as optical waveguides) can benefit from the use of silk fibroin.

Such structures, in many applications, must be fabricated with high resolution and precision. RSF added to biological dopants, such as enzymes, growth factors, or any other biological compounds, have fewer biological interactions than current inkjet-printed (IJP) structures. For these biomaterials, additive manufacturing techniques rather than conventional techniques for microfabrication purposes should be produced efficiently, given their higher volume throughput and long-term sustainability.

RSF added to biological dopants, such as enzymes, growth factors, or any other biological compounds, have fewer biological interactions than current inkjet-printed (IJP) structures. However, because of their tendency to gel, silk fibroin inks have not been useful in making IJP structures.

Several techniques that have been tried to fabricate silk fibroin into desired shapes. These include lithographic approaches and direct-write printing. The lithographic methods require stamp removal, which leads to a considerable amount of waste. Also, it is a subtractive method that involves multiple manufacturing steps. Multiphoton lithography can be used to scale patterns in fibroin down to about 100 nm. However, the process uses a laser, photo initiator dye, and other chemical additives that adversely affect the properties of the resulting fibroin structure.

Direct-write printing, an additive technology that uses computer-aided design (CAD) software to specify the geometric features of the printed patterns has been shown to overcome some of the weaknesses of lithography. There are four categories of direct-write printing: flow-based direct write, energy beam based direct write, tip-based direct write, and droplet based direct write. Inkjet and aerosol jet are droplet based direct write methods that have unique characteristics, can make them more amenable for processing materials such as silk fibroin solutions. Both of these two techniques are non-contact, maskless, scalable, and have a resolution of 10 μm.

However, a major challenge for printing silk fibroin is its low printability. There have been attempts at improved printability in which RSF solutions are mixed with synthetic polymers. This is done because the micro-nozzle head of an ink jet printer is frequently clogged due to the β-sheet crystallization induced by shear stress during printing. Also, the reduced mobility of macromolecular and shear thinning of the silk fibroin limits the concentration range that produce an optimal printing condition. Additionally, random degradation can occur during the degumming or dissolution, which can have a substantial impact on the ink viscosity.

Since inkjet printing is only able to process fibroin inks in the viscosity range of 10-40 cP, viscosity modifiers are often used in an attempt to adapt the functional ink to the printing environment, such as by increasing the viscosity of dilute solutions to increase printability. However, silk fibroin proteins tend to have viscosities that reduce the printability of the fibroin ink. While increasing the viscosity may lead to higher printability or finer resolution, it will decrease cell viability and solution stability, which can accelerate the gelation time of the RSF solution.

Therefore, there is a need for silk fibroin inks that can be used to make structures through additive printing techniques without clogging the print heads of the printers.

SUMMARY OF THE INVENTION

The disadvantages of the prior art are overcome by the present invention which, in one aspect, is a method of depositing a fibroin structure onto a surface, in which a fibroin ink is generated. The fibroin ink is aerosol jet printed onto a substrate.

In another aspect, the invention a method of printing a fibroin structure on a surface, in which a plurality of biologically-generated silk cocoons are each cut into at least two pieces of raw silk. The pieces of raw silk are degummed so as to remove sericin therefrom, thereby leaving fibroin fibers. The fibroin fibers are dissolved into a lithium bromide solution so as to generate a fibroin/salt solution. The salt is removed from the fibroin/salt solution so as to generate a fibroin solution by placing the fibroin/salt solution in a dialysis membrane tube and submerging the dialysis membrane tube with the fibroin/salt solution therein in deionized water according to a predetermined dialysis protocol. The fibroin solution is centrifuged to remove impurities therefrom so as to generate a fibroin ink by spinning the fibroin solution at about 4,500 rpm at a temperature no greater than about 4° C. for about 20 minutes and removing any impurities that have been concentrated thereby. The fibroin ink is atomized so as to generate a fibroin ink aerosol. The fibroin ink aerosol is directed to a print nozzle. A focusing gas sheath is directed around the print nozzle so as to deposit fibroin onto the surface.

In yet another aspect, the invention is a method of preparing a silk fibroin ink, in which pieces of raw silk are degummed so as to remove sericin therefrom, thereby leaving fibroin fibers. To do this, the raw silk dissolved into a sodium carbonate solution that contains sodium carbonate in water in a concentration of about 0.212% wt./vol. by boiling the raw silk in the sodium carbonate solution for about 75 minutes. The fibroin fibers are removed from the sodium carbonate solution by rinsing the fibroin fibers in deionized water three times for one minute each time. The fibroin fibers are dried by heating the fibroin fibers to about 80° C. for at least 21 hours. The fibroin fibers are mixed into a lithium bromide solution in water at concentration of about 80.77% wt./vol for about 2 hours, so as to generate a fibroin/salt solution. The salt is removed from the fibroin/salt solution so as to generate a fibroin solution by placing the fibroin/salt solution in a dialysis membrane tube and submerging the dialysis membrane tube with the fibroin/salt solution therein in deionized water according to a predetermined dialysis protocol. In the predetermined dialysis protocol, deionized water around the tube is changed until the fibroin solution comprises fibroin in water concentrated in a range of between 2.7% wt./vol. to 5.7% wt./vol. The deionized water is replaced about every hour for about 4 hours and, after 4 hours, replacing the deionized water about every 12 hours for about 44 hours. The fibroin solution centrifuged to remove impurities therefrom so as to generate a fibroin ink by spinning the fibroin solution at about 4,500 rpm at a temperature no greater than about 4° C. for about 20 minutes and removing any impurities that have been concentrated thereby, thereby leaving the silk fibroin ink.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
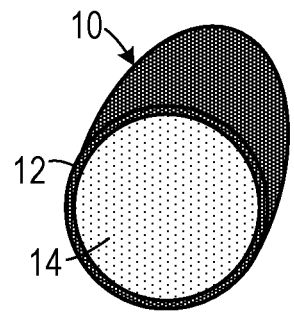
FIG. 1 is a schematic drawing of a portion of an existing silkworm cocoon.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2:
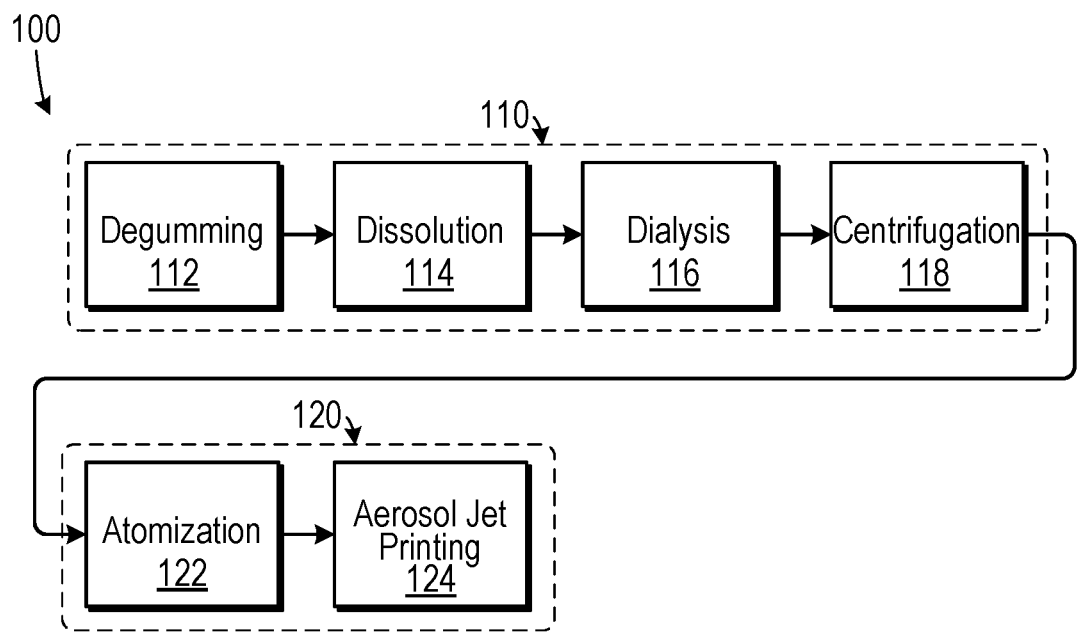
FIG. 2 is a flowchart demonstrating a fibroin ink preparation and printing process.

As shown in FIG. 2, one representative embodiment of a method for printing silk fibroin structures 100 involves to main parts: preparation of the regenerated silk fibroin (RSF) ink solution 110 and material fabrication of RSF thin films using aerosol jet printing (AJP) 120. The first part 110 starts with raw silk fibroin, such as natural silkworm cocoons that have been cut into pieces. The pieces are degummed 112 to remove the sericin from them and then dissolved 114 into a solution. The dissolution ions are removed through a dialysis process 116 and then particulate impurities are removed through centrifugation 118, leaving an RSF ink. In the material fabrication part 120, the RSF ink is atomized and then aerosol jet printed 124 onto a substrate.

Figure 3:
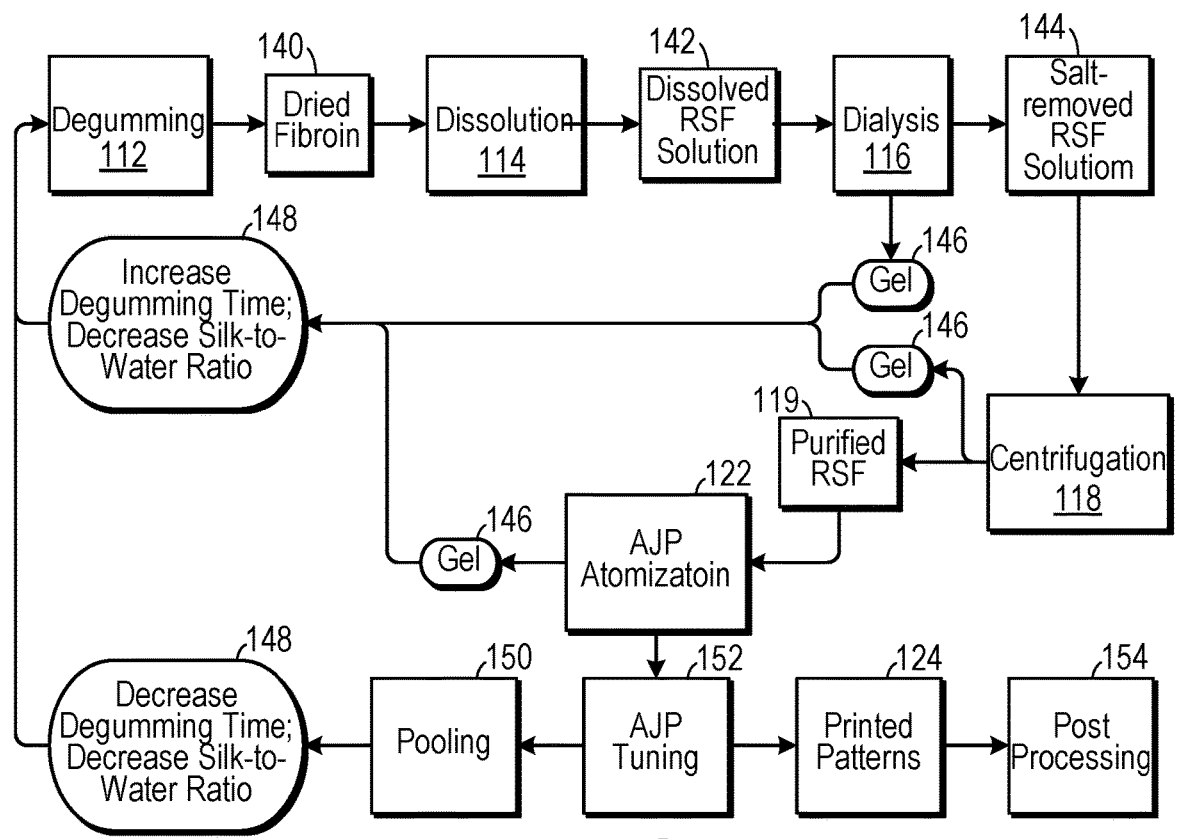
FIG. 3 is a control diagram demonstrating one method of fibroin ink preparation.

This process is shown in greater detail in FIG. 3, in which cocoons (which are typically 15 g-20 g) are cleaned and cut into quarters to increase the exposed surface area during degumming 112. The degumming solution is prepared by adding 0.02 M sodium carbonate to 2.5 L deionized (DI) water to form a 0.212% wt./vol. aqueous solution. The cocoon pieces are added to the sodium carbonate solution, which is maintained at about 100° C., while constantly stirring for about 75 minutes. which leaves fibroin fibers. After being rinsed three times in DI water, the fibroin fibers are placed in a covered container and heated to 80° C. in an oven for 24 hours until they are fully dry 140. Once dry, the fibroin fibers are removed to avoid over-heating of the fibroin fibers.

After drying 140, the degummed fibers are dissolved 114 in a lithium bromide solution. The solution is made by adding anhydrous lithium bromide (99% minimum) to DI water at a concentration of about 80.77% lithium bromide (9.3 M LiBr). Dissolution of the fibroin fibers is conducted at about 60° C. with magnetic stirrer for about 2 hours. The fibroin fibers are added in small amounts (~0.5 g) for more effective dissolution with manual stirring. This results in an RSF solution 142. Once fully dissolved (e.g., within 1.5-2 hours), the RSF solution is cooled and dialyzed 116. (The RSF solution can be stored at around 4° C. for later use.)

During the dialysis step 116, the RSF solution is placed in a dialysis membrane tube and dialyzed in DI water with a 1:200 ratio to wash out the LiBr. One embodiment employed a chemical dialysis membrane tubing (which can be obtained from VWR, Radnor, PA). The tube, prior to adding the RSF solution, can be soaked in DI water for at least 3 seconds to facilitate opening it. The tubing is filled with the RSF solution with both ends carefully clamped. In one embodiment the tube containing about 5 ml RSF solution is placed in 1 L of DI water. The DI water is changed every hour for the first 4 hours. After changing the DI water four times, the DI water is changed every 12 hours for an additional 44 hr. If the RSF solution shows signs of gelling 146, it is discarded and the process is restarted with an increase of the degumming time and/or a decrease in the silk-to-water ratio 148. Typically, the dialysis step takes about 48 hours or until substantially of the LiBr salt is removed 144 from the RSF solution.

In the centrifugation step 118, the RSF solution is centrifuged in centrifuge tubes. Centrifugation occurs at about 4,500 rpm at about 4° C. for about 20 minutes. If impurities are found in the solution after the initial centrifugation step the centrifugation process is repeated. If gelation 146 occurs by the end of centrifugation, the batch is discarded and the degumming and dissolution steps are repeated.

This process includes several loops, which provides corresponding steps in the case of unwanted phenomenon, such as formation of gel during one of the last steps of material preparation or during the atomization of the AJP, as well as pooling during the AJP tuning processes. The material preparation consists of four steps, degumming, dissolution, dialysis and centrifugation. The material fabrication consists of two steps, atomization and tuning parameters before actually moving on to printing. When no impurities are noticed, a purified RSF solution 119 or "RSF ink," has been generated.

The RSF ink can then be printed using aerosol jet printing (AJP). Initially, the RSF ink is atomized in a container 122. Again, if gelation is noticed at this stage, the batch is discarded and the process is restarted by adjusting parameters according to step 148. The AJP printer is tuned 152 by printing a test run. If pooling 150 of the RSF ink is noticed, then the batch is discarded and the process is repeated with an adjustment to decrease degumming time and/or decrease the silk-to-water ratio 148. Once satisfactory results are obtained, the desired patterns of silk fibroin are printed on a substrate 124 and any necessary post processing 154 of the resulting shapes occurs.

Figure 4:
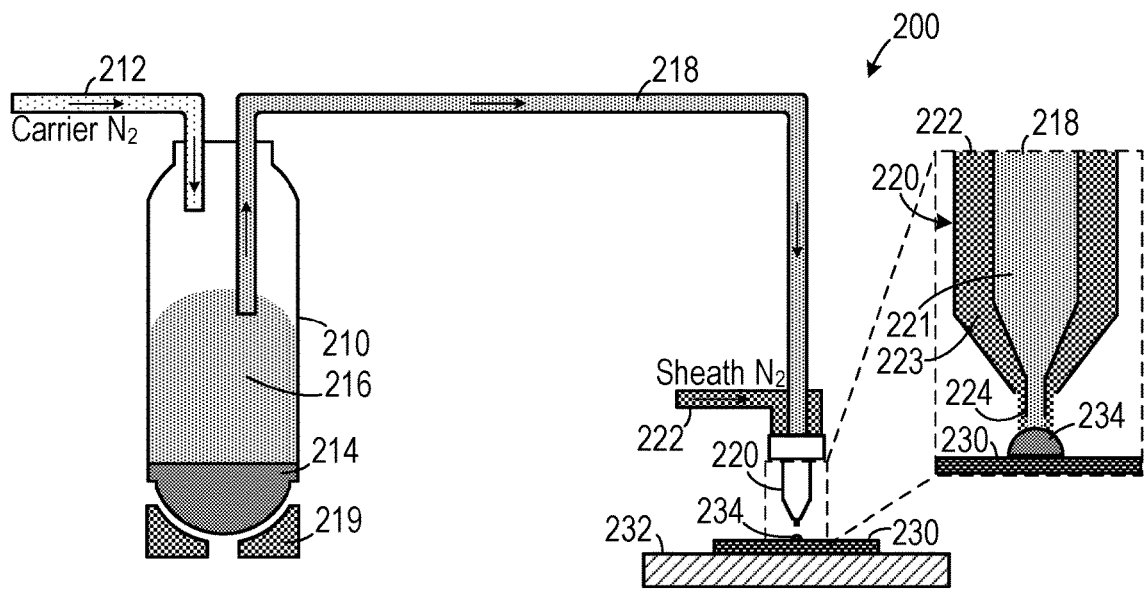
FIG. 4 is a schematic diagram of one type of fibroin aerosol jet printing apparatus.

One example of an AJP apparatus 200 is shown in FIG. 4, in which the RSF ink 214 is placed in a container 210. The RSF ink 214 is atomized using an ultrasonic transducer 219 that is configured to apply ultrasonic energy to the RSF ink 214 at an amplitude and frequency that results the formation of an RSF ink aerosol 216. A carrier gas 212, such as nitrogen, carries the RSF ink aerosol 216 to a print head 220 that surrounds an RSF ink aerosol stream with a sheathing gas 222, such as nitrogen, which focuses deposition of the RSF ink aerosol onto a substrate 230 to print the object 234. The print head 220, includes an inner passage 221 for directing the RSF ink aerosol 218 to a nozzle 224 and an outer passage 223 for carrying the sheathing gas 222. The substrate 230 is placed onto a computer-controlled translation table 232, which moves the substrate 230 according to a desired fibroin pattern.

The following table lists operating parameters used in one experimental embodiment:

| Step | Critical Item | Protocol |
| --- | --- | --- |
| Degumming | Na:SO₃ amount | 0.212% wt./vol. (0.02M) |
|  | Boiling time | 75 min. |
|  | Rinse | 3 times each 1 min in deionized (DI) water |
|  | Drying | Oven 80° C. 21~24 hr. |
| Dissolution | LiBr amount | 80.77% wt./vol. |
|  |  | Add silk to LiBr solution, 2 hr. |
| Dialysis | Volume | 5 ml SF to 1 L DI water |
|  | Water Change | 4 changes each hour for the first 4 hr. |
|  | Time | 48 hr. |
| Centrifuge |  | 4500 rpm at 4° X for 20 min. |
| RSF Solution | Concentration | 2.7%-5.7% wt./vol. |

In one experimental embodiment, each batch of RSF solution formed produced around 5 ml of purified RSF solution. If gelation occurs before or during AJP atomization, it suggests the degumming time is shorted than desired. Thus, the batch of solution was discarded and a new batch was made using increased degumming time, by up to 15 min in 5 min intervals. If pooling occurred while tuning the AJP, the batch of RSF solution was deemed unprintable and was discarded because this suggested that the degumming time is longer than desired. In this case, a new batch of RSF solution was prepared by decreasing the degumming time by up to 15 min in 5 min intervals. It was found that also decreasing the ratio of silk fibers to deionized (DI) water could lead to more uniform degumming.

One experimental embodiment, the AJP system used an Optomec Aerosol Jet that included a vial containing RSF ink and a deposition head, which was connected to the vial via a perfluoroalkoxy alkanes (PFA) tubing. The ultrasonic atomizer created aerosol of RSF ink inside the vial, which was carried towards the deposition head by Nitrogen. The ultrasonic atomizer was designed for a lower viscosity range. The sheath gas at the deposition head generated a focused beam as the ink was deposited onto the substrate. AJP delivers a continuous stream of aerosols while printing with a shutter. The shutter has a back-and-forth movement within 1 cm distance controlled by the software to pause the flow at designated locations where it is not supposed to be deposited. During the AJP process microdroplets of RSF ink rapidly solidified and collected on the shutter and, therefore, the shutter was cleaned with Acetone every 30 min. In the experimental embodiment, the substrate used was copper foil laminated on a thin glass slide with no air bubbles entrained to ensure flatness.

There are two main process parameters for controlling the AJP: carrier gas flow rate and sheath gas flow rate. The carrier gas flow rate (also referred to as atomizer flow rate or ink flow rate) in one embodiment should have a maximum of about 50 sccm (standard cubic centimeters per minute). This parameter controls the amount of mist generated from the atomization to the deposition head. The sheath gas flow rate (sheath rate) dictates the flow rate of the microdroplets deposited at the deposition head should be between 20 to 150 sccm in one embodiment.

The whole system, including vial support, tubing, deposition head, etc. should be thoroughly cleaned using, for example, an ultrasonic bath, and rinsed with Acetone before each RSF ink printing to minimize contamination. A test pattern before and after printing can be printed to ensure stable and accurate equipment performance from the initial to the last print, which can be part of the AJP tuning step. A test pattern (in the form of a line or circle) can be deposited frequently on a spare substrate to ensure that that the AJP printer is working within desired tolerance.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of depositing a fibroin structure onto a substrate, comprising the steps of:
   (a) generating a fibroin ink, by executing a plurality of steps, including:
      (i) cutting a plurality of biologically-generated silk cocoons each into at least two pieces of raw silk;
      (ii) degumming the pieces of raw silk so as to remove sericin therefrom, thereby leaving fibroin fibers;
      (iii) dissolving the fibroin fibers into a lithium bromide solution so as to generate a fibroin/salt solution;
      (iv) removing the salt from the fibroin/salt solution so as to generate a fibroin solution by placing the fibroin/salt solution in a dialysis membrane tube and submerging the dialysis membrane tube with the fibroin/salt solution therein in deionized water according to a dialysis protocol; and
      (v) centrifuging the fibroin solution to remove impurities therefrom so as to generate a fibroin ink by spinning the fibroin solution at about 4,500 rpm at a temperature no greater than about 4° C. for about 20 minutes and removing any impurities that have been concentrated thereby so that the fibroin solution comprises fibroin in water concentrated in a range of between 2.7% wt./vol. to 5.7% wt./vol.; and
   (b) aerosol jet printing the fibroin ink onto the substrate.

2. The method of claim 1, wherein the degumming step comprises the steps of:
   (a) dissolving the raw silk into a sodium carbonate solution;
   (b) removing the fibroin fibers from the sodium carbonate solution; and
   (c) drying the fibroin fibers.

3. The method of claim 2, wherein the sodium carbonate solution contains sodium carbonate in water in a concentration of about 0.212% wt./vol. and wherein the dissolving step comprises the step of boiling the raw silk in the sodium carbonate solution for about 75 minutes.

4. The method of claim 2, wherein the removing step comprises the step of rinsing the fibroin fibers in deionized water three times for one minute each time.

5. The method of claim 2, wherein drying step comprises the step of heating the fibroin fibers to about 80° C. for at least 21 hours.

6. The method of claim 1, wherein the lithium bromide solution comprises lithium bromide in water in a concentration of about 80.77% wt./vol.

7. The method of claim 1, further comprising the step of mixing the fibroin fibers with the lithium bromide solution for about 2 hours.

8. The method of claim 1, wherein the dialysis protocol comprises the steps of:
   (a) replacing the deionized water about every hour for about 4 hours;
   (b) after 4 hours, replacing the deionized water about every 12 hours for about 44 hours; and
   (c) monitoring the fibroin/salt solution for 44 more hours to ensure that there is no gelation.

9. The method of claim 1, wherein the centrifuging step comprises spinning the fibroin solution at about 4,500 rpm at a temperature no greater than about 4° C. for about 20 minutes and removing any impurities that have been concentrated thereby.

10. The method of claim 1, wherein the aerosol jet printing step comprises the steps of:
    (b) atomizing the fibroin ink with a carrier gas so as to generate a fibroin ink aerosol;
    (c) directing the fibroin ink aerosol to a print nozzle with a maximum carrier gas flow rate of 50 sccm; and
    (d) directing a focusing gas sheath around the print nozzle so as to deposit fibroin onto the substrate, wherein the focusing gas sheath has a sheath gas flow rate of 20 sccm to 150 sccm.

11. The method of claim 10, further comprising the step of moving the substrate laterally along a pattern so as to generate the fibroin structure.

12. A method of printing a fibroin structure onto a substrate, comprising the steps of:
    (a) generating a fibroin ink, by executing a plurality of steps, including:
       (i) cutting a plurality of biologically-generated silk cocoons each into at least two pieces of raw silk;
       (ii) degumming the pieces of raw silk so as to remove sericin therefrom, thereby leaving fibroin fibers by;
          boiling the raw silk in a sodium carbonate solution for about 75 minutes so as to dissolve the raw silk into the sodium carbonate solution, wherein the sodium carbonate solution includes sodium carbonate in water in a concentration of about 0.212% wt./vol.;
          removing the fibroin fibers from the sodium carbonate solution; and drying the fibroin fibers by heating the fibroin fibers to about 80° C. for at least 21 hours;
       (iii) dissolving the fibroin fibers into a lithium bromide solution that includes lithium bromide in water in a concentration of about 80.77% wt./vol. so as to generate a fibroin/salt solution;
       (iv) removing the salt from the fibroin/salt solution so as to generate a fibroin solution by placing the fibroin/salt solution in a dialysis membrane tube and submerging the dialysis membrane tube with the fibroin/salt solution therein in deionized water according to a dialysis protocol; and
       (v) centrifuging the fibroin solution to remove impurities therefrom so as to generate a fibroin ink by spinning the fibroin solution at about 4,500 rpm at a temperature no greater than about 4° C. for about 20 minutes and removing any impurities that have been concentrated thereby so that the fibroin solution includes fibroin in water concentrated in a range of between 2.7% wt./vol. to 5.7% wt./vol.; and
    (b) atomizing the fibroin ink with a carrier gas so as to generate a fibroin ink aerosol;
    (c) directing the fibroin ink aerosol having a maximum flow rate of 50 sccm to a print nozzle; and
    (d) directing a focusing gas sheath around the print nozzle so as to deposit fibroin onto the substrate, wherein the focusing gas sheath has a sheath gas flow rate in a range of 20 sccm to 150 sccm.

13. The method of claim 12, wherein the removing step comprises the step of rinsing the fibroin fibers in deionized water three times for one minute each time.

14. The method of claim 12, further comprising the step of mixing the fibroin fibers with the lithium bromide solution for about 2 hours.

15. The method of claim 12, wherein the dialysis protocol in step (iv) comprises the steps of:
   (a) replacing the deionized water about every hour for about 4 hours;
   (b) after 4 hours, replacing the deionized water about every 12 hours for about 44 hours; and
   (c) monitoring the fibroin/salt solution for 44 more hours to ensure that there is no gelation.

16. The method of claim 12, further comprising the step of moving the substrate laterally along a pattern so as to generate the fibroin structure.

17. A method of printing a fibroin structure onto a substrate, comprising the steps of:
   (a) generating a fibroin ink, by executing a plurality of steps, including:
      (i) cutting a plurality of biologically-generated silk cocoons each into at least two pieces of raw silk;
      (ii) degumming the pieces of raw silk so as to remove sericin therefrom, thereby leaving fibroin fibers by;
         boiling the raw silk in a sodium carbonate solution for about 75 minutes so as to dissolve the raw silk into the sodium carbonate solution, wherein the sodium carbonate solution includes sodium carbonate in water in a concentration of about 0.212% wt./vol.;
         removing the fibroin fibers from the sodium carbonate solution; and
         drying the fibroin fibers by heating the fibroin fibers to about 80° C. for at least 21 hours;
      (iii) dissolving the fibroin fibers into a lithium bromide solution that includes lithium bromide in water in a concentration of about 80.77% wt./vol. and mixing the fibroin fibers with the lithium bromide solution for about 2 hours so as to generate a fibroin/salt solution;
      (iv) removing the salt from the fibroin/salt solution by rinsing the fibroin fibers in deionized water three times for one minute each time so as to generate a fibroin solution by placing the fibroin/salt solution in a dialysis membrane tube and submerging the dialysis membrane tube with the fibroin/salt solution therein in deionized water according to a dialysis protocol; and
      (v) centrifuging the fibroin solution to remove impurities therefrom so as to generate a fibroin ink by spinning the fibroin solution at about 4,500 rpm at a temperature no greater than about 4° C. for about 20 minutes and removing any impurities that have been concentrated thereby so that the fibroin solution includes fibroin in water concentrated in a range of between 2.7% wt./vol. to 5.7% wt./vol.; and
   (b) aerosol jet printing the fibroin ink onto the substrate.

18. The method of claim 17, wherein the aerosol jet printing step comprises the steps of:
   (a) atomizing the fibroin ink with a carrier gas so as to generate a fibroin ink aerosol;
   (b) directing the fibroin ink aerosol to a print nozzle, in which the carrier gas has a carrier gas flow rate not greater than 50 sccm; and
   (c) directing a focusing gas sheath around the print nozzle so as to deposit fibroin onto the substrate, wherein the focusing gas sheath has a sheath gas flow rate in a range from 20 sccm to 150 sccm; and
   (d) moving the substrate laterally along a pattern so as to generate the fibroin structure.

19. The method of claim 17, wherein the dialysis protocol in step (iv) comprises the steps of:
   (a) replacing the deionized water about every hour for about 4 hours;
   (b) after 4 hours, replacing the deionized water about every 12 hours for about 44 hours; and
   (c) monitoring the fibroin/salt solution for 44 more hours to ensure that there is no gelation.

* * * * *